United States Patent [19]

Laue et al.

[11] Patent Number: 4,720,376

[45] Date of Patent: Jan. 19, 1988

[54] PROCESS FOR THE REMOVAL OF NITROGEN OXIDES AND SOOT FROM EXHAUST GASES OF MACHINES AND COMBUSTION INSTALLATIONS BURNING HEAVY FUEL OIL

[75] Inventors: Karl H. Laue, Hattingen; Claus Flockenhaus; Erich Hackler, both of Essen; Blagoje Levkov, Wiesbaden; Daniel Grimm, Schlangenbad-Bärstadt; Hartmut Kainer, Wiesbaden; Hermann Stein, Bad Durkheim; Hans-Eugen Bühler, Königstein, all of Fed. Rep. of Germany

[73] Assignees: Didier Engineering GmbH, Essen; Didier-Werke AG, Wiesbaden, both of Fed. Rep. of Germany

[21] Appl. No.: 860,306

[22] Filed: May 6, 1986

[30] Foreign Application Priority Data

May 7, 1985 [DE] Fed. Rep. of Germany ....... 3516359

[51] Int. Cl.$^4$ .............................................. B01J 37/00
[52] U.S. Cl. .................... 423/239; 423/213.2; 423/213.5
[58] Field of Search .................. 423/213.2, 213.5, 239, 423/239 A, 659

[56] References Cited

U.S. PATENT DOCUMENTS

| 3,880,129 | 4/1975 | Hollis, Jr. ...................... 123/119 A |
| 4,049,777 | 9/1977 | Divivier et al. ...................... 423/209 |
| 4,051,821 | 10/1977 | Amann ................. 123/97 B |
| 4,102,980 | 7/1978 | Sasaki et al. ..................... 423/239 A |
| 4,164,124 | 8/1979 | Taylor et al. .......................... 60/683 |
| 4,193,972 | 3/1980 | Pohlenz ............................. 423/239 |
| 4,205,635 | 6/1980 | Kirn et al. ....................... 123/32 EA |
| 4,205,644 | 6/1980 | Treadwell et al. ............. 123/119 A |
| 4,235,604 | 11/1980 | Wagener et al. ....................... 48/197 |
| 4,259,312 | 3/1981 | Flockenhaus et al. ............. 423/659 |
| 4,359,862 | 11/1982 | Virk et al. ........................... 423/239 |
| 4,448,895 | 5/1984 | Ono et al. ........................... 502/304 |
| 4,503,162 | 8/1985 | Windawi et al. .................... 502/174 |
| 4,505,106 | 3/1985 | Frankenberg et al. ............... 60/286 |
| 4,506,143 | 3/1985 | Telis et al. .......................... 219/497 |
| 4,550,592 | 11/1985 | Dechape .............................. 73/37.5 |

FOREIGN PATENT DOCUMENTS 1960533 12/1964 Fed. Rep. of Germany .
0095871 8/1978 Japan .................................. 423/239

Primary Examiner—Gregory A. Heller
Assistant Examiner—R. Bruce Breneman
Attorney, Agent, or Firm—Nils H. Ljungman

[57] ABSTRACT

A process for the removal of nitrogen oxides and soot from exhaust gases from machines and combustion installations burning heavy fuel oil by means of free-passage catalysts at increased temperatures with the addition of ammonia into the exhaust gas stream ahead of the catalysts. To make the process mre effective, the soot adhering to the catalyst surfaces is removed by burning it off and/or by friction resulting from the admixture of sand, ash or similar abrasive mixtures into the exhaust gas stream ahead of the catalysts.

7 Claims, 2 Drawing Figures

PROCESS FOR THE REMOVAL OF NITROGEN OXIDES AND SOOT FROM EXHAUST GASES OF MACHINES AND COMBUSTION INSTALLATIONS BURNING HEAVY FUEL OIL

CROSS REFERENCE TO CO-PENDING APPLICATIONS

Co-pending application Ser. No. 768,418, now abandoned, filed on Aug. 22, 1985, entitled "Process For Cleaning An Exhaust Gas", corresponding to Federal Republic of Germany Patent Application No. P 34 30 870.0, filed on Aug. 22, 1984; co-pending application Ser. No. 768,508, now U.S. Pat. No. 4,672,052 filed on Aug. 22, 1985, entitled "Catalyst For Removal of Nitrogen Oxides From Exhaust Gases", corresponding to Federal Republic of Germany Patent Application No. P 34 30 886.5, filed on Aug. 22, 1984; co-pending application Ser. No. 831,142, filed on Feb. 21, 1986, entitled "Catalyst For The Selective Reduction of Nitrogen Oxides In Waste Gases And Process For the Manufacture and Use Of Such a Catalyst", corresponding to Federal Republic of Germany Patent Application No. P 35 05 648.7, filed on Feb. 19, 1985; and co-pending application Ser. No. 860,307, filed on May 7, 1986, entitled "Process For The Removal Of Nitrogen Oxides And Soot From Exhaust Gases Of Diesel Engines", now abandoned, corresponding to Federal Republic of Germany Patent Application No. P 35 16 360.7, filed on May 7, 1985, are all assigned to the same assignee as the instant application and are incorporated herein by reference as if the texts thereof were fully set forth herein.

BACKGROUND OF THE INVENTION

1. Field of the Invention

The invention relates to a process for the removal of nitrogen oxides and soot from exhaust gases of machines and combustion installations burning heavy fuel oil by means of free-passage catalysts at increased temperatures, with the addition of ammonia into the exhaust gas stream ahead of the catalysts.

2. Description of the Prior Art

Exhaust gases from machines burning heavy fuel oil or installations in which heavy fuel oil is burned contain significant quantities of nitrogen oxides and soot (Bacherach 5-7). Nitrogen oxides, for example, have been removed from flue gases since about 1965 by means of an iron oxide chromium oxide catalyst, with the addition of appropriate amounts of ammonia. The temperatures at the catalyst are approximately 280° C. to 350° C. It has been shown that soot particles thereby accumulate on the catalyst, and over time, the catalysts become clogged. Even when bulk catalysts are used, there is a residual clogging, in spite of the burn-off of the soot, because the soot from heavy fuel oils is contaminated with non-combustible ingredients, for example, vanadium pentoxide, nickel oxide, ash, etc. These ingredients inevitably clog the catalyst bed, so that the desired removal of nitrogen oxides is adversely affected.

OBJECTS OF THE INVENTION

It is therefore an object of the present invention to achieve effective removal of nitrogen oxides and soot through an improvement to the process of the type described above.

It is another object of the present invention to remove soot particles accumulated in a catalyst.

It is a further object of the present invention to remove soot particles and thus revitalize a free-passage catalyst.

It remains a yet further object of the present invention to provide a process for the removal of nitrogen oxides and soot from exhaust gases, which process is efficient, reliable and economical.

SUMMARY OF THE INVENTION

The above, as well as other objects of the invention, are achieved through the removal of soot which accumulates on the surfaces of the catalyst, by burning away and/or by friction resulting from the admixture of sand, ash or similar abrasive mixtures to the exhaust gas stream ahead of the catalysts. An abrasive mixture may be intermittently added to the exhaust gas stream, so that it intermittently removes the deposited layer of soot from the catalyst. The abrasive mixture leaving the catalyst can be pneumatically recycled in the catalyst circuit, so that the new admixture of abrasive substances can be reduced correspondingly. A portion of the low nitrogen exhaust gas stream leaving the catalyst can be advantageously used for this pneumatic recycling of the abrasive mixture. An additional feature of this invention permits the soot contained in the low-nitrogen-oxide exhaust gas stream leaving the catalyst to be burned away during transport through the catalyst circuit. According to this feature, an ignition agent for the soot is also added to the exhaust gas stream ahead, i.e. upstream, of the catalysts and/or to the recycled low-nitrogen-oxide exhaust gas stream in the circuit. The soot on the catalyst surface can be at least partially burned off and/or burned away in the flue stream of the abrasive mixture circuit.

Thus, the present invention provides a process for removal of nitrogen oxides and soot from exhaust gases of combustion apparatus of the type which burn heavy fuel oil by passing the exhaust gas through free-passage catalysts at increased temperatures with the addition of ammonia to the exhaust gas stream ahead of the catalysts. The invention provides the steps of selectively admixing a selected abrasive material into the exhaust gas prior to passing the exhaust gas into the free-passage catalyst means. This abrasive material, through frictional contact with the soot adhering to the free-passage catalyst, removes at least a portion of the soot therefrom. At least a portion of the abrasive material is selectively withdrawn after passage through the catalyst for use in recycling of that material to the exhaust gas prior to the exhaust gas entering the catalyst. In other words, the selectively withdrawn abrasive material is recycled pneumatically in a catalyst circuit.

BRIEF DESCRIPTION OF THE DRAWINGS

The above as well as other features and advantages of the present invention can be more readily appreciated through consideration of the detailed description of the invention in conjunction with the drawings, in which.

DESCRIPTION OF PREFERRED EMBODIMENTS

Figure 1:
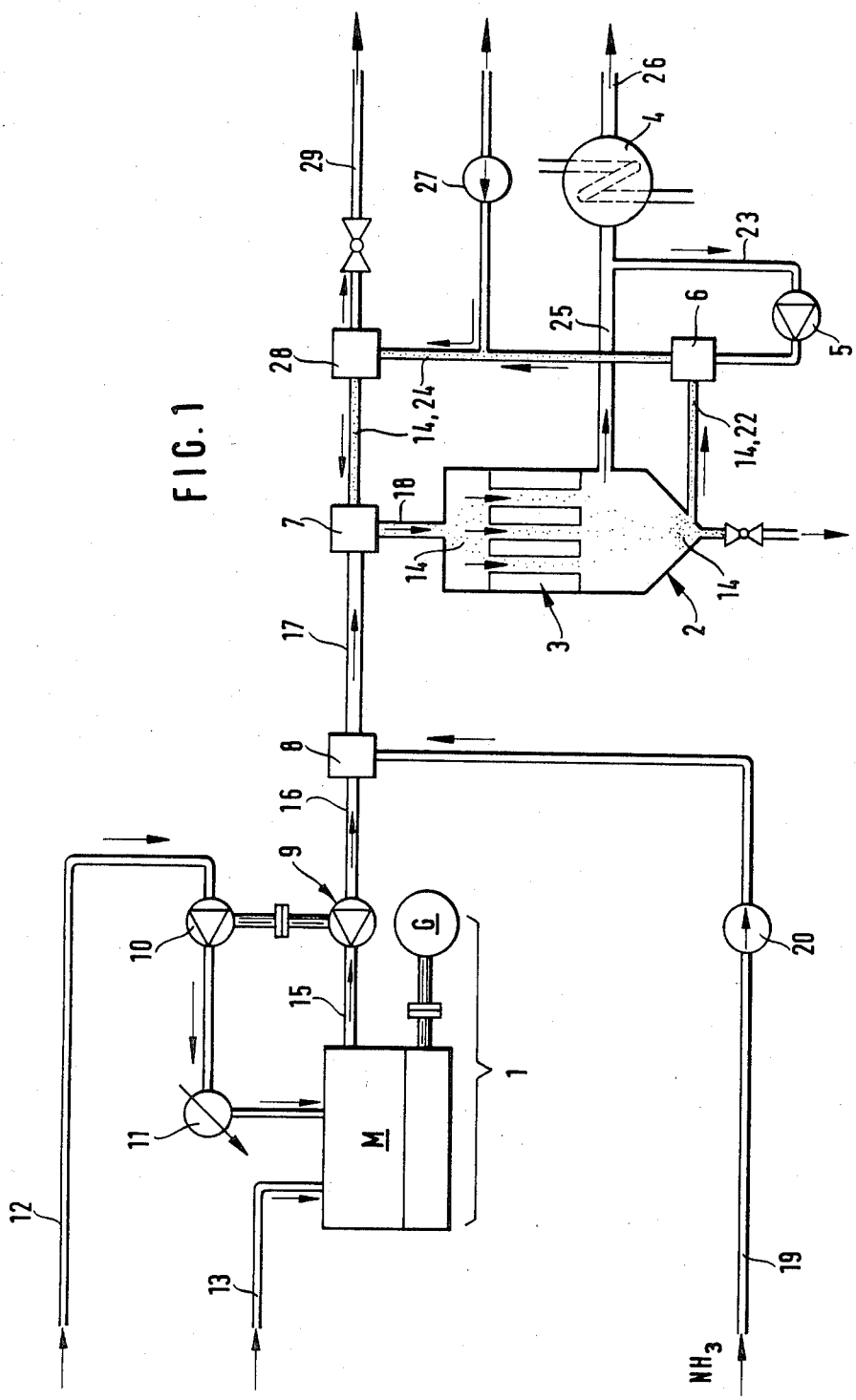
FIG. 1 is a schematic representation of a machine or combustion installation burning heavy fuel oil which utilizes the process of this invention.

The invention provides a process for the removal of nitrogen oxides and soot from exhaust gases of machines in combustion installations of the type which burn heavy fuel oil. In FIG. 1, the exhaust gas stream exiting a machine 1 burning heavy fuel oil, comprising a diesel motor M and a generator G, is conducted via a line 15, an exhaust gas turbine 9, and a line 16 to an NH$_3$-mixer 8, in which the exhaust gas is thoroughly mixed with NH$_3$, the NH$_3$ being fed from a line 19 via a doser 20. The temperature of the mixture in the subsequent line 17 is approximately 400° C. By means of another mixer 7 (to be described below) and a line 18, the mixture of exhaust gas and NH$_3$ is conducted to a separate reactor 2, which contains a free-passage catalyst 3. Thus, according to this invention, the preferred catalysts are used with so-called free passages in perforated plates or tubes. Some examples of catalytic technology are found in U.S. Pat. No. 4,259,312, entitled "Process and Apparatus For Catalytically Reacting A Reducing Gas And Water Vapor"; U.S. Pat. No. 4,235,604, entitled "Method For Processing Coke Oven Gas"; and U.S. Pat. No. 4,049,777, entitled "Method Of Waste Gas Treatment", all of which are assigned to the same assignee as the present application and incorporated herein by reference.

Further examples of catalytic technology are found in U.S. Pat. No. 4,448,895, entitled "Process For Preparation Of Catalyst For Cleaning Exhaust Gases And Catalyst Prepared For The Process", and U.S. Pat. No. 4,503,162, entitled "Catalyst Systems For The Conversion Of Gases", both of which patents are incorporated herein by reference as if fully set forth herein.

As usual, the nitrogen oxide is reduced at between about 320° C. and 350° C. with the admixture of ammonia. Soot 14, which adheres to the catalyst surface, that is, to the free-passages, is removed either by burn-off where possible or by friction from artificial sand, ash, or other abrasives according to a technique which will be described hereinafter. The low-nitrogen-oxide exhaust gas at approximately 405° C. is released into the atmosphere via a line 25, a heat exchanger 4, and a line 26. Soot adhering to the catalyst 3 is abraded away from the surface of the catalyst by an abrasive mixture, which can consist of sand, ash or similar dust, with a preferable grain size of between about 0.1 millimeter and 1 millimeter, added to the exhaust gas stream in the mixer 7. Moreover, a good abrasive action for the soot 14 is achieved if the exhaust gas is transported through the catalyst with a velocity of at least 5 meters per second. The admixture of the abrasive mixture can be made intermittently. The soot 14 and the abrasive mixture collect in the lower portion of the reactor 2, unless the soot 14 is removed as excess soot via the line 25 and fed to a combustion installation. The abrasive mixture is recycled pneumatically in the circuit into the catalyst 3 via a line 22 at the lower end of the reactor 2 to a mixer 6, a separator 28, the mixer 7, and the line 18. For the pneumatic recycling, low-nitrogen-oxide exhaust gas can be taken from line 25. The transport of this portion of the exhaust gas takes place via a line 23 and a blower 5 into the mixer 6. Fine abrasive dust which is formed, for example, fine dust ash, can be separated in the separator 28 and ejected via a line 29. For the combustion of the excess soot, an ignition agent can be added to the line 24, preferably via a doser apparatus 27. Alternatively, the excess soot can be fed to a combustion installation.

In FIG. 1, the combustion air intake conduit 12 is further from the exhaust gas turbine 9, and a compressor 10 is disposed between the intake of the air intake conduit 12 and the exhaust gas turbine 9. There is an air change intercooler 11 disposed between the compressor 10 and the diesel motor M. A fuel conduit 13 is connected to the motor M to provide fuel therefor.

In a practical test, a motor burning heavy fuel oil produced approximately 50,000 m$^3$/h (iN) (iN=normalized to 20° C. at 1 atmosphere of pressure) of exhaust gas. The temperature behind the subsequent turbine was approximately 390° C. With a nitrogen oxide level of approximately 350 ppm (parts per million), approximately 19 m$^3$/h (iN) ammonia was added, the mixture conducted over approximately 30 m$^3$ free-passage catalyst. The nitrogen oxide content after the catalyst was found to be 70 ppm. After approximately 10 hours of operation, on a smaller test machine, the catalyst was found to be clogged by the adherence of soot. By adding fine sand to the exhaust gas stream, the blockage was eliminated. The free-passage catalyst was also burned clear again, without an excessive temperature increase, by the admixture of a small quantity of an ignition agent into the exhaust gas stream ahead of the catalyst, for example, pentane or heptane, as described hereinafter, but residues were found on the catalyst which could not be burned away.

Figure 2:
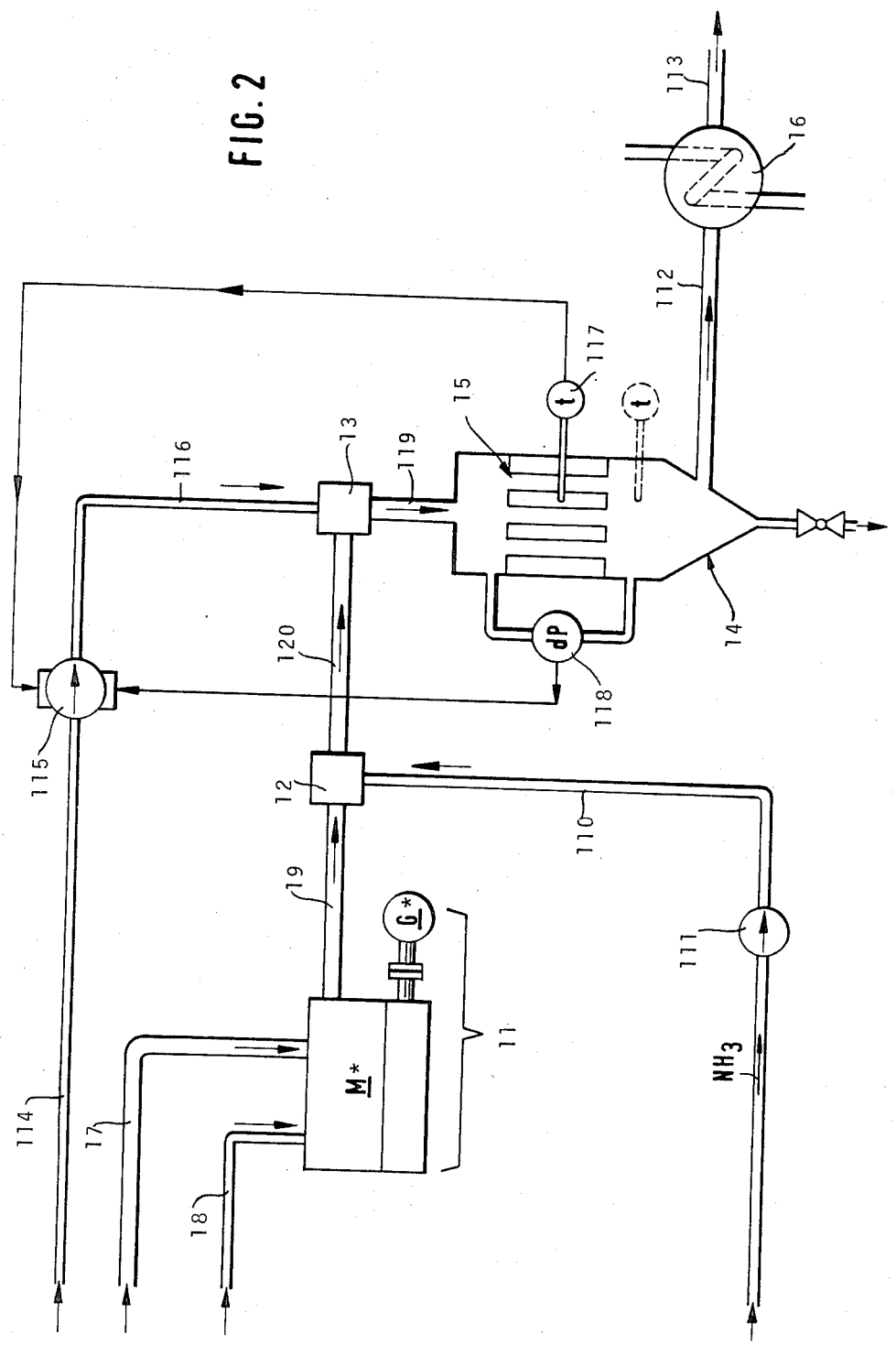
FIG. 2 is a schematic representation of diesel system.

Referring now to FIG. 2, from the diesel system 11, comprising a diesel motor M* and a generator G*, the exhaust gases travel through a line 19 to a mixer 12, in which the required amount of ammonia (NH$_3$) is added to the exhaust gases from a line 110 by means of a dosing apparatus 111. The gas mixture is then conducted via a line 120, a mixer 13, and a line 119 to a reactor 14, in which there is a catalyst 15, for example, a free-passage catalyst.

Via a line 114, a dosing apparatus 115, and a line 116, an ignition agent, for example, pentane or heptane, is added to the mixer 13 and to the exhaust gas flow ahead of the catalyst 15, for example, by injection. The addition of the ignition agent can be done periodically, to bring the deposited soot to the ignition temperature. The soot is then burned off with the oxygen in the exhaust gas. The low-nitrogen exhaust gas is discharged from the reactor 14 to a heat exchanger 16 via a line 112, and from there is discharged from the installation via a line 113. In the heat exchanger 16, the heat of combustion of the ignition agent, of the soot and any unburned gaseous components, can be recovered. The dosing of the ignition agent is controlled by the dosing apparatus 115 so that the heat released from the combustion of the soot and the ignition agent locally reaches the maximum tolerable temperature at the catalyst 15. The catalyst 15 is preferably operated between 320° C. and 460° C. The ignition agent used is preferably a material which is easy to store and which can be oxidized with oxygen at low temperatures, such as hydrocarbon mixtures, preferably pentane or heptane, which ignite below 270° C.

The pressure loss of dP (or ΔP) of the exhaust gas flowing through the catalyst 15 can be measured by means of a pressure measurement apparatus 118. The pressure loss increases with increasing soot deposits on the catalyst surfaces. If the pressure loss dP measured with the pressure measurement apparatus 118 exceeds a specified value, then the dosing apparatus 115 receives a signal to inject ignition agent into the exhaust gas stream, so that a reduction of the soot deposit occurs through combustion. If the pressure loss dP again drops below a specified value, the pressure measurement apparatus 118 can again give a signal to the dosing apparatus 115 to shut off the addition of ignition agent. An air intake 17 and a fuel intake 18 are both connected to and feed the diesel motor M*. Examples of pressure sensitive systems are described in U.S. Pat. No. 4,205,644, entitled "Exhaust Gas Recirculation Valve With Adjustable Pressure Transducer"; U.S. Pat. No. 3,880,129, entitled "Pressure Transducer And Exhaust Gas Recirculation Control Valve Using Same"; U.S. Pat. No. 4,051,821, entitled "Exhaust Back Pressure Control"; and U.S. Pat. No. 4,550,592, entitled "Pneumatic Gauging Circuit". All of the afore-mentioned patents are incorporated herein by reference as if the texts thereof were fully set forth herein.

In addition, by means of a temperature measurement apparatus 117, for example, a thermo-element, on the catalyst 15, preferably in the uppermost catalyst layer which is most in danger of overheating, the temperature of the catalyst 15 is monitored to prevent overheating. If the temperature measured at the catalyst 15 exceeds a specified value, the temperature measurement apparatus 117 gives a signal to the dosing apparatus 115, to discontinue the addition of ignition agent and to prevent any further temperature increase. If the temperature of the catalyst 15 drops below a specified value, the dosing apparatus 115 can be reactivated by means of the temperature measurement apparatus 117, to resume the addition of ignition agent. In this manner, the desired temperature of the catalyst 15 can be maintained and overheating can be prevented. Examples of temperature systems are described in U.S. Pat. No. 4,205,635, entitled "Fuel Mixture Control System" and U.S. Pat. No 4,506,143, entitled "Automatic Temperature Control Device". Both of the afore-mentioned patents are incorporated herein by reference as if the texts thereof were fully set forth herein.

The invention can be used not only in stationary diesel engines, such as in electric generating stations, but also in ships, for example. The invention makes it possible to keep the environmental air clean relatively easily and economically, because the catalyst is no longer adversely affected by soot deposits, and the exhaust air is freed of soot particles. The possibility of burning the soot is influenced by the properties of the soot itself. The goal is to burn the soot and to leave as little residue as possible. For optimum application of the invention, therefore, diesel engines should be operated whenever possible with diesel oil. The use of fuel-injected diesel engines is also possible.

To test the invention, a time interval of 2.5 to 3 hours was determined on an ordinary diesel operation as appropriate for the intermittent addition of ignition agent to the exhaust gases, until the next addition of ignition agent. It was demonstrated here that approximately 0.5 l of ignition agent is sufficient for 1000 $m^3/h$ (iN) of exhaust gas, to burn away the soot which is formed.

The invention as described hereinabove in the context of the preferred embodiment is not to be taken as limited to all of the provided details thereof, since modifications and variations thereof may be made without departing from the spirit and scope of the invention.

What is claimed is:

1. A process for the removal of nitrogen oxides from exhaust gases and soot from a free-passage catalyst of machines and combustion apparatus of the type burning heavy fuel oil by passing the exhaust gases through said free-passage catalyst at high temperatures with the addition of ammonia into the exhaust gas stream upstream of said free-passage catalyst, the improvement comprising the steps of:

selectively admixing an abrasive material into said exhaust gas prior to passing said exhaust gas into said free-passage catalyst, whereby said abrasive material, through frictional contact with the soot adhering to the free-passage catalyst, removes at least a portion of the soot therefrom, selectively withdrawing at least a portion of said abrasive material after passage through said free-passage catalyst for recycle with said exhaust gas prior to the passage of said exhaust gas into said free-passage catalyst, and introducing an ignition agent into the recycled exhaust gas to combust soot remaining therein.

2. The process according to claim 1, wherein the selectively withdrawn abrasive material is pneumatically recycled in a catalyst circuit.

3. The process according to claim 2, whereby a portion of the exhaust gas, having passed through the free-passage catalyst and rendered low in nitrogen and oxide content, is drawn therefrom and utilized for the pneumatic recycling of the at least a portion of abrasive material withdrawn from the free-passage catalyst.

4. The process according to claim 1, wherein the abrasive material is selected from the group consisting of sand, ash or similar abrasives.

5. The process according to claim 4, wherein the abrasive material has a particle size of between about 0.1 millimeter and 1 millimeter.

6. The process according to claim 1, wherein the exhaust gas stream passes through the catalyst at a velocity of at least 5 meters per second.

7. The process according to claim 1, including the step of supplying any excess soot remaining after the passage of the exhaust gas through the free-passage catalyst to a combustion installation.

* * * * *